(12) United States Patent
Sharon et al.

(10) Patent No.: US 10,862,906 B2
(45) Date of Patent: Dec. 8, 2020

(54) PLAYBOOK BASED DATA COLLECTION TO IDENTIFY CYBER SECURITY THREATS

(71) Applicant: Palo Alto Networks, Inc., Santa Clara, CA (US)

(72) Inventors: Doron Sharon, Kefar Saba (IL); Meir Wahnon, Tel Aviv (IL); Aviad Lichtenstadt, Tel Aviv (IL)

(73) Assignee: PALO ALTO NETWORKS, INC., Santa Clara, CA (US)

( * ) Notice: Subject to any disclaimer, the term of this patent is extended or adjusted under 35 U.S.C. 154(b) by 216 days.

(21) Appl. No.: 15/932,229

(22) Filed: Feb. 16, 2018

(65) Prior Publication Data
US 2019/0260769 A1   Aug. 22, 2019

(51) Int. Cl.
*H04L 9/00* (2006.01)
*H04L 29/06* (2006.01)

(52) U.S. Cl.
CPC ...... *H04L 63/1416* (2013.01); *H04L 63/1441* (2013.01); *H04L 2463/146* (2013.01)

(58) Field of Classification Search
USPC .......................................................... 726/23
See application file for complete search history.

(56) References Cited

U.S. PATENT DOCUMENTS

| | | | | |
|---|---|---|---|---|
| 7,039,830 B2* | 5/2006 | Qin | ..................... | G06F 11/1461 714/13 |
| 8,566,726 B2* | 10/2013 | Dixon | ................. | H04L 63/1441 705/35 |
| 9,124,622 B1* | 9/2015 | Falkowitz | ........... | H04L 63/1416 |
| D759,077 S | 6/2016 | Bergmann et al. | | |
| D759,079 S | 6/2016 | Carlton et al. | | |
| D762,665 S | 8/2016 | Lee et al. | | |
| D771,103 S | 11/2016 | Eder | | |
| D775,658 S | 1/2017 | Luo et al. | | |
| D786,610 S | 5/2017 | Koehler | | |
| D788,792 S | 6/2017 | Alessandri et al. | | |
| D795,886 S | 8/2017 | Ng et al. | | |
| D798,311 S | 9/2017 | Golden et al. | | |
| D799,536 S | 10/2017 | Eder | | |
| D811,425 S | 2/2018 | Olsen et al. | | |
| D829,739 S | 10/2018 | Lavin, Jr. | | |
| 2018/0124098 A1* | 5/2018 | Carver | ..................... | G06F 21/50 |

OTHER PUBLICATIONS

Official Action for U.S. Appl. No. 29/618,806, dated Mar. 7, 2019 8 pages.

* cited by examiner

*Primary Examiner* — Christopher J Brown
(74) *Attorney, Agent, or Firm* — Gilliam IP PLLC

(57) ABSTRACT

A comprehensive security operation platform with artificial intelligence capabilities which may collaborate and/or automate tasks, including complex and/or redundant security tasks. An automated system may assist security analysts and security operations center managers in discovering security incidents. A comprehensive security operations platform may combine intelligent automation scale and collaborative human social learning, wisdom and experience. An automated system may empower security analysts to resolve incidents faster and reduce redundancy through collaboration with peers in virtual war rooms. An automated system may automate security analyst work by executing tasks from the war room or by following playbooks defined by the security analysts.

24 Claims, 12 Drawing Sheets

Fig. 3A

| Associated User(s) Information | Event ID | Event Occurrence Timestamp | Associated Device(s) Information | Tag(s) | Associated IP Address(es) | Severity Level | Security Analyst Notes | ... |
|---|---|---|---|---|---|---|---|---|
| 303 | 306 | 309 | 312 | 315 | 318 | 321 | 324 | 327 |

| | ID | Name | Type | Severity | Status | Owner | Playbook | Occurred |
|---|---|---|---|---|---|---|---|---|
| ☐ | #7924 | Re: Phishing Investigation | Phishing | High | Active | Emily | Phishing | September 20, 2018, 11:37 |
| ☑ | #7925 | Suspicious Email | Unclassified | High | Active | Joe | EmailAskU | October 8, 2018, 13:45 |
| ☐ | #7926 | Suspicious URL | URL | High | Active | Rob | RapidURL | October 9, 2018, 14:50 |
| ☐ | #7927 | FW: Enter Password | Phishing | Unknown | Closed | Alison | Phishing | November 1, 2018, 08:30 |

353 356 359 362 365 368 371 374 377

350  380

New Incident

Basic information

Name:
Occurred:
Reminder:
Owner:
Type:
Severity:
Playbook:
Labels:
Phase:
Details:

[Reset Form] [Attach Document] [Cancel] [Create New Incident]

*Fig. 4*

Current Task

Deadline: Dec. 22, 2026 | Task ID: 023847
Severity: Low | Incident ID: 098541
Assigned Analyst: T.X.Z. | Playbook ID: 09123

Instructions:

Call User <X> at 555-555-5555
Ask if X visited a wifi hotspot with client device <Z>, an HP laptop, in past week

[Yes] [No] [No Reply]

Notes:

[Complete]

Pending Tasks
- Call User <X>
- Update Ticket
- Enter Report

Completed Tasks
- Call User <W>
- Send Email

PLAYBOOK BASED DATA COLLECTION TO IDENTIFY CYBER SECURITY THREATS

FIELD

The present disclosure relates generally to systems and methods of implementing cyber security and more particularly to methods and systems of combating cyber security threats within a computer network.

BACKGROUND

As computer networks become commonplace in businesses, the threat of cyber-security attacks affecting users and devices throughout a network becomes ever more present. The need for an active cyber security threat monitoring system is critical. To combat the threat of cyber security attacks, organizations implement a large number of security products and hire many security analysts. As the threats of cyber security attacks grow in number and the increasingly large number of security products are installed on various user devices throughout a network, the ability of a security analyst to identify attacks in time to mitigate damage is hindered.

The large number of security products, instead of helping security analysts in combating security threats, complicate the issue by inundating security analysts with security alerts. Security analysts may investigate a number of different alerts daily, document each of them, and report them regularly. As a result, security analysts may end up having "alert fatigue" or otherwise become less responsive to each individual security alert. Much of the work security analysts perform is essentially duplicating past work of another security analyst.

A primary objective of cyber security systems, including work by cyber security analysts, is to ultimately maximize system security and minimize network damage resulting from cyber security threats. An ongoing challenge in cyber security analysis is combating numerous threats playing out simultaneously across a network. Cyber security analysts must find ways to optimize the response time and maximize efficiency. Current products for cyber security threat analysis are simply lacking in efficiency and require many educated analysts working around the clock to identify, analyze, and remediate many types of threats across a network.

There remains a need for a more efficient system enabling cyber security analysts to be more efficient and capable of responding to threats requiring human interaction while being free from the distractions of tasks which are capable of being performed solely by a computer system. It is therefore desirable to provide an automated system of cyber security threat analysis.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3A illustrates an incident identifier in accordance with at least some embodiments of the present disclosure;

FIG. 3B illustrates an incident identifier database in accordance with at least some embodiments of the present disclosure;

FIG. 4 illustrates a new incident window user interface in accordance with at least some embodiments of the present disclosure;

FIG. 5E illustrates a user interface in accordance with at least some embodiments of the present disclosure;

DETAILED DESCRIPTION

Figure 1:
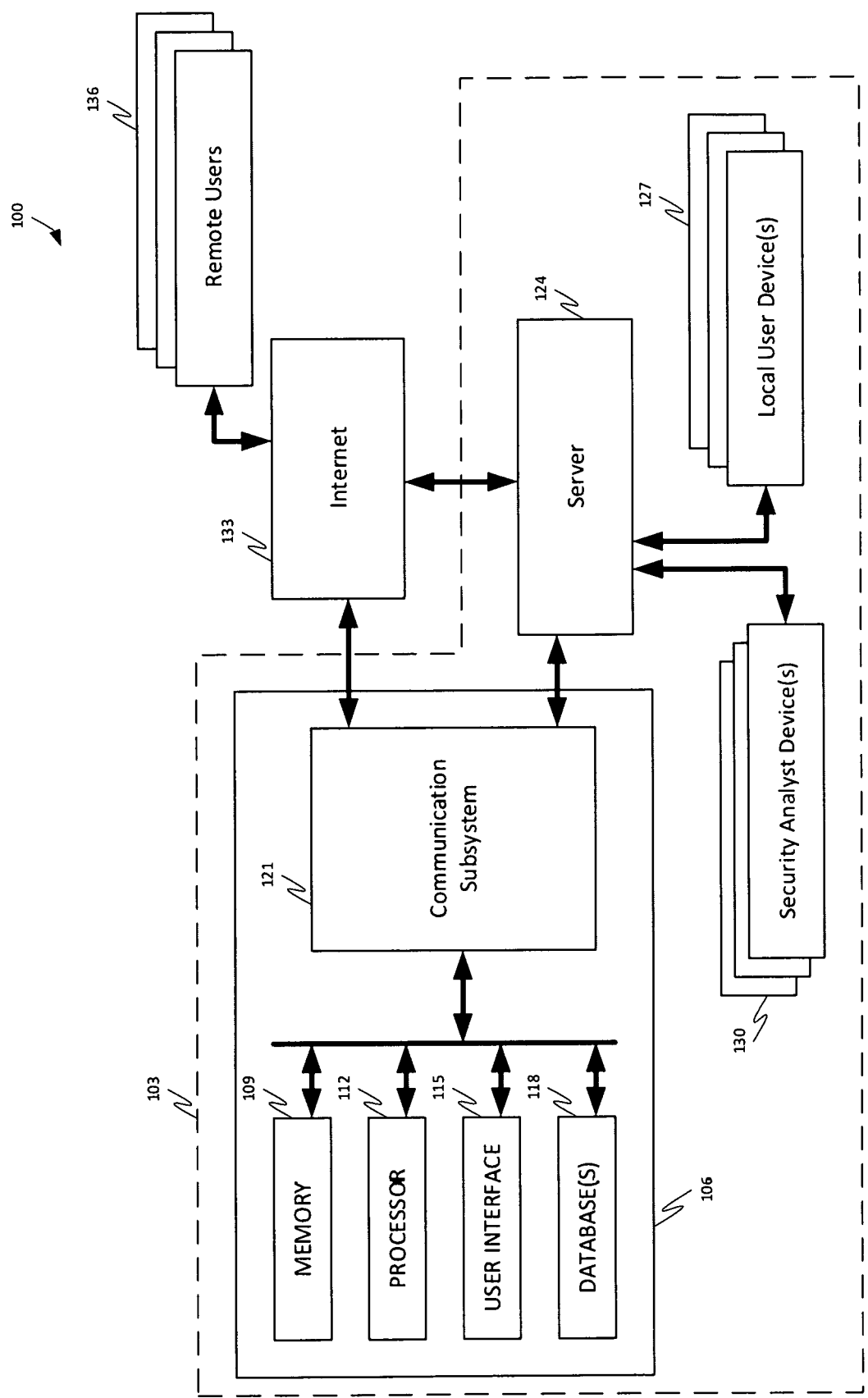
FIG. 1 illustrates a network environment in accordance with at least some embodiments of the present disclosure.

What is needed is a comprehensive security operation platform with artificial intelligence capabilities which may collaborate and/or automate tasks, including complex and/or redundant security tasks. An automated system may assist security analysts and security operations center managers in discovering security incidents. A comprehensive security operations platform may combine intelligent automation scale and collaborative human social learning, wisdom and experience. An automated system may empower security analysts to resolve incidents faster and reduce redundancy through collaboration with peers in virtual war rooms. An automated system may automate security analyst work by executing tasks from the war room or by following playbooks defined by the security analysts.

These and other needs are addressed by the various embodiments and configurations of the present invention. The invention is directed generally to automated and partially-automated methods of analysing security threats as well as methods and systems for assisting human security analysts in the identification and targeting of security threats. By utilizing a system of automating, either fully or partially, steps required during a security threat analysis, security analysts may be free to pursue other tasks, for example tasks requiring human input. These and other advantages will be apparent from the disclosure of the invention(s) contained herein.

The phrases "plurality", "at least one", "one or more", and "and/or" are open-ended expressions that are both conjunctive and disjunctive in operation. For example, each of the expressions "a plurality of A, B, and C", "at least one of A, B, and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The term "data stream" refers to the flow of data from one or more, typically external, upstream sources to one or more downstream reports.

The term "dependency" or "dependent" refers to direct and indirect relationships between items. For example, item A depends on item B if one or more of the following is true: (i) A is defined in terms of B (B is a term in the expression for A); (ii) A is selected by B (B is a foreign key that chooses which A); and (iii) A is filtered by B (B is a term in a filter expression for A). The dependency is "indirect" if (i) is not true; i.e. indirect dependencies are based solely on selection (ii) and or filtering (iii).

The terms "determine", "calculate" and "compute," and variations thereof, as used herein, are used interchangeably and include any type of methodology, process, mathematical operation or technique.

The term "item" refers to data fields, such as those defined in reports, reporting model, views, or tables in the database.

The term "module" as used herein refers to any known or later developed hardware, software, firmware, artificial intelligence, fuzzy logic, or combination of hardware and software that is capable of performing the functionality associated with that element. Also, while the invention is described in terms of illustrative embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

Although the present disclosure is discussed with reference to security analysis systems, it is to be understood that the invention can be applied to numerous other architectures, such as any system utilizing a computer network and/or a network of less sophisticated computing devices like the Internet of Things (IoT). The present disclosure is intended to include these other architectures and network types.

As illustrated in FIG. 1, a computer network environment 100 in accordance with some embodiments may comprise a local network 103 in communication with a wide area network (WAN) such as the Internet 133. In some embodiments, a local network 103 may comprise a security operation platform 106. A security operation platform 106 may be a computer system comprising one or more memory devices 109, one or more processors 112, one or more user interface devices 115, one or more databases 118, and a communication subsystem 121. The security operation platform 106 may, in some embodiments, be part of a local network 103 comprising a local server 124 and a number of local user devices 127. The local network 103 may further comprise one or more security analyst devices 130 in communication with the security operation platform 106 via the server 124. The communication subsystem 121 of the security operation platform 106 may be connected to and in communication with the local server 124 as well as a wide area network (WAN) such as the Internet 133. Via the Internet 133, the security operation platform 106 may be capable of communicating with a number of remote users 136, which may or may not correspond to trusted or known users. Although not depicted, the local network 103 is typically separated from the untrusted network (in the form of the Internet 133) by a firewall, gateway, session border controller or similar type of network border element. In some embodiments, a firewall and/or gateway may be positioned between the server 124 and Internet 133. The same firewall and/or gateway or a different firewall and/or gateway may be positioned between the communication subsystem 121 and the Internet 133. The placement of the firewall and/or gateway enables the firewall and/or gateway to intercept incoming and outgoing traffic travelling between the Internet 133 and local network 103. As is known in the networking arts, the firewall and/or gateway may perform one or more inspection processes on the data packets/messages/data streams passing there through and, in some instances, may intercept and quarantine such data packets/messages/data streams if determined to be (or likely to be) malicious.

The security operation platform 106 may also be in communication with one or more security analyst devices 130. For example, a security analyst working at a security analyst terminal, computer, or other computing device 130, may be capable of working in tandem with the security operation platform 106.

Figure 2:
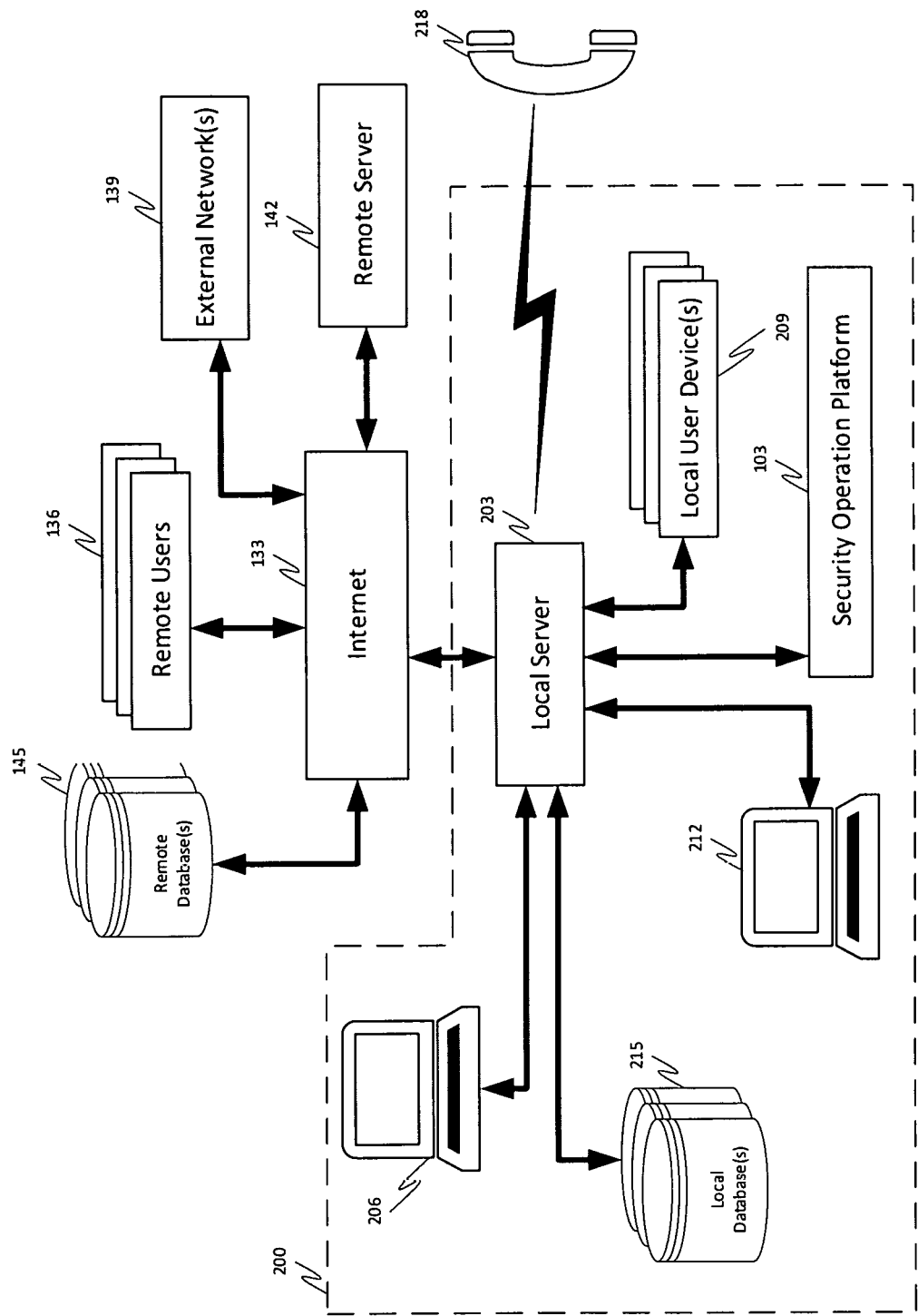
FIG. 2 illustrates a network environment in accordance with at least some embodiments of the present disclosure.

As illustrated in FIG. 2, the Internet 133 may provide access to one or more external networks 139, external servers 142, remote user devices 136, remote databases 145, and web services.

The local network 200, in some embodiments, may comprise one or more local servers 203, network administrator devices 206, local user devices 212, local databases 215, etc. As with FIG. 1, although not depicted, a firewall and/or gateway device may be positioned between the local server 203 and Internet 133, thereby providing security mechanisms for the network 200.

The security operation platform 103 may also be capable of placing telephone calls via a phone line 218 or via VoIP and/or sending automated email messages.

Telephone calls made by the security operation platform 103 may be automatically dialed by the system and conducted by a security analyst user of the security operation platform 103. In some embodiments, the security operation platform 103 may present a notification display to the security analyst user instructing the security analyst user with details on which number to dial and what questions to ask. In some embodiments, the security operation platform 103 may auto-dial the number and instruct the security analyst user to ask particular questions. In some embodiments, the security operation platform 103 may auto-dial the number and play recorded messages instructing a receiver of the phone call to input data via the telephone.

Similarly, emails may be automatically drafted and sent by the security operation platform 103 in some embodiments, while in other embodiments the security operation platform 103 may instruct a security analyst to draft and/or send the email.

The security operation platform 103 may be capable of automatically making a number of machine-to-machine inquiries. For example, if the security operation platform 103 determines certain data is required, the security operation platform 103 may determine a location, e.g. a network location, where such data may be found. The security operation platform 103 may then send a request or poll or otherwise gather such data.

In some embodiments, a workflow may begin upon a cyber security event being detected or upon a user request. For example, a user may submit information to a security operation platform providing details on a suspected cyber security threat. Alternatively, a security operation platform may detect a cyber security event occurring on a network.

All known information associated with a particular cyber security event may be collected. Such information may be used to generate an incident identifier. An incident identifier may comprise a data packet, csv file, etc. and may be used as a database of all known information associated with the particular cyber security event. A data packet 300 which may be an incident identifier as discussed herein is illustrated in FIG. 3A.

A data packet, or incident identifier, 300 may comprise data such as associated user information 303 for users associated with the incident. For example, the user requesting the cyber security analysis may automatically be added as an associated user. Information identifying the requesting user may be a user ID, an email address, a device IP address, a phone number, etc. Other data associated with an associated user may be saved within the incident identifier, or may be saved in a database accessible to a cyber security analyst. For example, an associated user information filed may be a user ID which may be used by a cyber security analyst (or by a security operation platform) to look up additional user information, such as a phone number, email address, list of associated devices, etc.

An incident identifier 300 may also comprise data used to identify the event 306. For example, upon a request for event analysis or upon detecting a cyber security threat event, a security operation platform may assign an event ID 306. An event ID 306 may be used to look up past events by reference.

An incident identifier 300 may also comprise data associated with an event occurrence timestamp 309. For example, a user requesting analysis of a potential cyber security threat may provide a time and date or an estimated time and date of an occurrence related to the potential cyber security threat. In some embodiments, a security operation platform may detect a potential cyber security threat and log the time of detection as an event occurrence timestamp 309.

An incident identifier 300 may also comprise data associated with associated device information 312. For example, if the analysis is being executed due to a request by a user, the user may provide information identifying the device or devices affected by the suspected threat. As more affected devices are discovered during analysis, the number of entries in the associated device information 312 field may grow. In some instances, the associated device information 312 field may be empty at the beginning of an analysis if no affected device is known.

An incident identifier 300 may also comprise data associated with one or more tags 315. For example, an incident identifier 315 may be tagged with indicators such as "suspicious IP", "suspicious URL", "phishing", "DDoS", etc. Tags 315 may be added automatically by a security operation platform, or may be added manually by a security analyst. Tags 315 may be used to search through a number of incident identifiers 300 and may be used to find similar incidents. For example, an illustrative user interface display window 350 is illustrated in FIG. 3B.

An incident identifier 300 may also comprise data associated with associated IP addresses 318. For example, each of the known affected devices may be associated with an IP address. Such IP addresses may be listed in the associated IP address 318 field. Other IP addresses may also be listed. Each IP address may also be tagged with additional information, such as "affected device", "first affected device", etc. The IP addresses may belong to any network device (or group of network devices) belonging to the local network.

An incident identifier 300 may also comprise data associated with a severity level 321. For example, if the analysis is being executed due to a request by a user, the user may provide information related to an estimated level of severity. The level may be a rating, for example on a scale of one-to-ten. In some embodiments, the severity level may be set automatically by a security operation platform.

An incident identifier 300 may also comprise data associated with security analyst notes 324. For example, if the analysis is being executed due to a request by a user, the user may provide textual information describing the background and circumstances of the security threat. In some embodiments, a security analyst may provide additional notes during analysis. In some embodiments, a security operation platform may automatically add notes based on analysis. In some embodiments, an incident identifier 300 may comprise other data 327.

As illustrated in FIG. 3B, information associated with a number of security threats may be catalogued in a database 350. Each entry 380 may comprise a checkbox 353, an ID number 356, a name entry 359, a security threat type 362, a severity rating 365, a status 368, an owner 371, a playbook 374, and an occurrence timestamp 377. In some embodiments, a database entry may have a greater or lesser number of fields. A database may be stored on a network connected device and may be accessible by a number of security threat analysts. A database may be continuously updated as new threats are identified. Each entry may be updated as new information is discovered about a particular threat. For example, a security analyst may be enabled by the database to view similar threats based on type, severity, occurrence time, owner, etc.

When a user becomes aware of a potential cyber security threat, the user may report the threat to a security operation platform via a form 400 as illustrated in FIG. 4. A form 400 may comprise a user interface displayed on a user device. In some embodiments, a form 400 may provide entry blanks for a user to fill out descriptions of a number of attributes associated with a potential cyber security threat. Information entered into a form 400 may be used to automatically create an entry in a database as illustrated in FIG. 3B.

In some embodiments, a form 400 may comprise entry forms for basic information about a potential cyber security threat such as name of the user, occurrence time and/or date of the threat, a reminder time and/or date, an owner, a type of threat, a severity level, a playbook, a label, a phase, and an entry form for details. In some embodiments, it may be typical for a user identifying a potential security threat to be unable to complete every entry in a form 400. For example, a user may receive a suspicious email. Such a user may decide to report the suspicious email. The user may open a security threat analysis application on the user's device and click a UI button opening a new incident form such as the form 400 illustrated in FIG. 4. Such a user may type the user's name in the form, the day and/or time the suspicious email was received, and may in a details box enter a short description, such as "suspicious email received". In some embodiments, the form may allow a user to attach a file, such as a .msg file comprising the suspicious email, or an image file showing a screenshot or other relative information associated with the threat.

When details of a potential cyber security threat are received by a security operation platform, the security operation platform may begin a process of analysis of the potential threat. The process of analysing the potential threat may begin by selecting a playbook from memory. One or more local databases accessible by a security operation platform may be capable of storing a number of playbooks in memory. A playbook may comprise a series of tasks. In some embodiments, a playbook may comprise a workflow for security analysts working with automated processes during a cyber security incident. A playbook may comprise a mix of both manual and automated processes or tasks.

A task in a playbook is typically any piece of an action that could be automated or scripted. Typically when an analyst is dealing with an incident, the analyst will want to go to some of the security products operating on a network server or a client device or elsewhere. They may want to go and simply query and collect information, or they may want to take an action. Each of these steps could be automated. For example, when we look at integrated products, there may be a number of security products integrated into the system. Tasks may be any number of security actions. For example, a task may be one or more of the following:

fetch <security product> search results
search <security product> for events
create new search job in <security product>
print all <security product> index names
update an existing event in <security product>
conduct a web search using <Google or Bing, etc.>
run a query of <security product> and receive results
generate random incidents per given parameter
search known actors based on given parameters
request/receive Intel Report
check [input file/IP/URL] reputation
input [IP address of a file] output: all known client devices containing the file
input [host name or IP] output: all devices associated with that input
input [request for computers running windows XP] output: list of computers running windows XP
input [domain name] output [domain reputation]
input [affected file] output [scanned file results]
add [input file] to blacklist [output: success]
input [name/IP of file] output [all known data, such as publisher, creator, owner, where is it found, is it bad or good, any known associated malware]
input [IP address], output [who registered to, who does it belong to, where is it geolocated, etc.]

A playbook may also comprise one or more conditional tasks in which a question is asked. For example, a first task may comprise a request for a reputation of a domain. A conditional task may ask a reputation question, e.g., if the reputation is bad, then perform task A and if the reputation is good, then perform the task B.

When an incident is created, playbooks may run automatically. When a manual task is initiated, the process along that chain may stop and wait for an input. An analyst may see a manual task, perform it, and input the requested output, or select a complete button.

One analyst may be assigned a number of different incidents. The analyst may not be aware of the automated tasks being performed. Manual tasks from each of the different incidents may appear as they begin on the analyst's terminal. The analyst may simply perform each one and click complete so that each playbook may continue.

One manual task may be answer yes or no and if the security analyst answers yes, the security platform may take one path and if the security analyst answers no, the security platform may take another path. Each playbook may be assigned to a particular analyst.

In some embodiments, the concept of a task may be broad. A task could as simple a step as sending an email, asking a question to another product, calling an API, wiping a system, anything which could be returned by a computer program could be an individual task. In the context of a security program, typically a task is more related to the API actions available in one or more security products. Actions supported by partnered security products via their API.

In some embodiments, a task may comprise the security platform automatically instructing an entity to perform a response action. Response actions may comprise one or more of reimaging an affected device and restoring the affected device from a backup. A response action may, in some embodiments comprise an identity of one or more processes with open connections executing on the affected device.

An input of a task does not need to be the output of the most immediately preceding task. An input of a task could be one or more outputs of one or more of any of preceding tasks. One task may comprise gathering information and such information may not be used in another task until three or more intermediate tasks have executed. As playbooks become more complex, for example a playbook comprising fifty or more tasks, if all outputs of all tasks are displayed to a user creating a new task as possible inputs, the design of the system may become overly complicated. Instead, the number of inputs visible to a user adding a task may be limited to only those outputs of preceding tasks within the new task's chain. So, an analyst creating or editing a playbook may be assisted by the security platform pre-calculating possible tasks and flows for the playbook. Real-time calculations of the path may be made as the playbook is edited. Pre-filtering the list of options available for the user to choose based on real-time path calculation in the playbook may enable a more efficient workflow to be created.

A process, or task, may comprise the security operation platform requesting specific data from a network source. In some embodiments, certain tasks may be automated. For example, when a task is repeated and/or does not require human intervention, the security operation platform may automatically perform the task and retrieve data to update an incident identifier. Using retrieved data, the security operation platform may continue to perform additional tasks based on one or more playbooks. Automated tasks may comprise checking a reputation of an entity, querying an endpoint product, searching for information in one or more network locations, sending emails requesting data from users, making telephone or VoIP phone calls requesting data, and other potentially automated processes.

In some embodiments, certain tasks may be completable only by a human user. For example, if a task requires speaking with a user or otherwise collecting data not accessible via a network, the security operation platform may instruct a human security analyst to perform a task. While waiting for input from the security analyst, the security operation platform may either proceed to perform other tasks or may simply pause the process until input is received.

Each process may result in a modification to the following processes. For example, an output of a first process may be an input to a second process. The workflow of a playbook may follow a particular path based on an output of a task, for example the workflow may depend on a number of if-this-then-that statements.

Figure 5A:
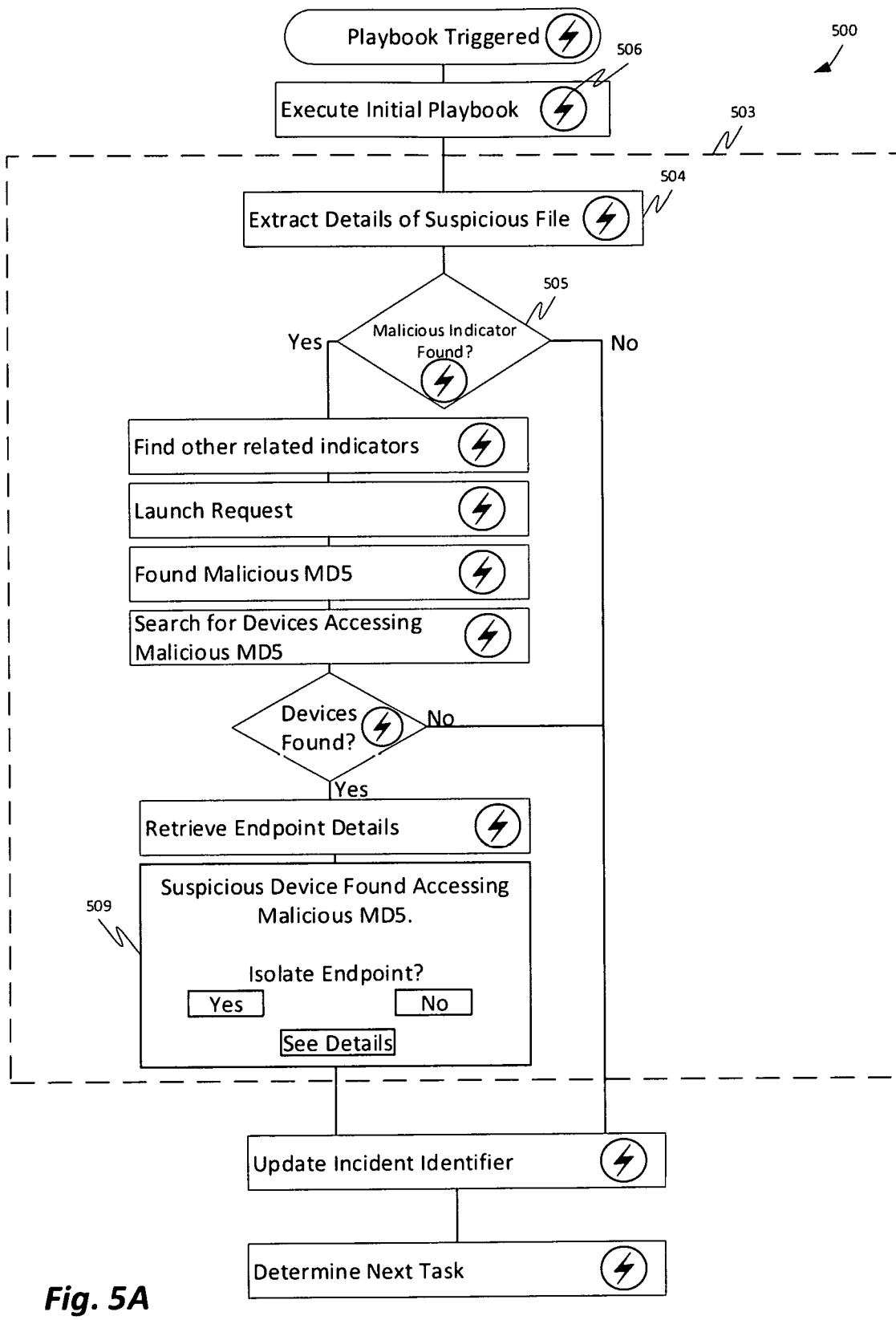
FIG. 5A illustrates a playbook window user interface in accordance with at least some embodiments of the present disclosure.

As illustrated in FIG. 5A, a playbook may be represented by a user interface visualization 500 presented on a user interface of a security analyst terminal. Note that the tasks listed in the playbook illustrated in the figures are example tasks only. Each playbook or task may begin with the playbook or task being triggered. When a user request for analysis of a potential security threat is received, or when a potential security threat is detected by a security operation platform, a playbook may be triggered. In the case of a task, the task may be triggered when all tasks preceding the immediate task have been completed.

In general, all tasks have inputs and generate outputs. Many playbooks may also accept or expect inputs.

When a playbook is triggered, a window on a security analyst terminal may present a flowchart or other representation of the tasks to be executed. As discussed herein, one playbook may comprise a number of playbooks and/or tasks. One such playbook comprising a number of tasks is represented by the rectangular dotted line 503 in FIG. 5A. Each entry in a playbook may represent a task. Each task may be automated or may require human interaction. A security analyst viewing the visualization of the playbook may be shown a symbol 506 indicating whether a task is automated. If a non-automated task is executed, a window 509 may be displayed within the visualization 500 to an analyst allowing for input.

In the example of FIG. 5A, the playbook 500 may be triggered which may cause an initial playbook to execute. The initial playbook may comprise a number of tasks, for example gathering affected user info or affected client device info. The initial playbook may also comprise receiving a quarantined suspicious file. Such tasks may be automated, manual, or a mix of automated and manual tasks. Automated tasks may be performed by a processor of a computing device, or security platform. Automated tasks may be performed in the background of a security analyst terminal. Manual tasks may comprise displaying instructions on a user interface of a security analyst terminal to be performed by a security analyst.

A playbook may have an output. The output of the initial playbook may be a suspicious file. Tasks or playbooks may comprise gathering data, such as suspicious files, user information, etc., and storing such data in a network location accessible to the security platform. Such data may be used in future tasks as inputs.

In the example of FIG. 5A, when the initial playbook has completed, the suspicious file gathered in the initial playbook may be used as an input to the next step 504. The next step 504 may comprise a processor of the security platform calling an API of a security product to extract details of the suspicious file. While many details of the suspicious file may be extracted in the step 504, not all may be inputs to following tasks. Continuing the example of FIG. 5A, the following step 505 may be a conditional task in which it is determined whether a malicious indicator was found among the details of the suspicious file.

Figure 5B:
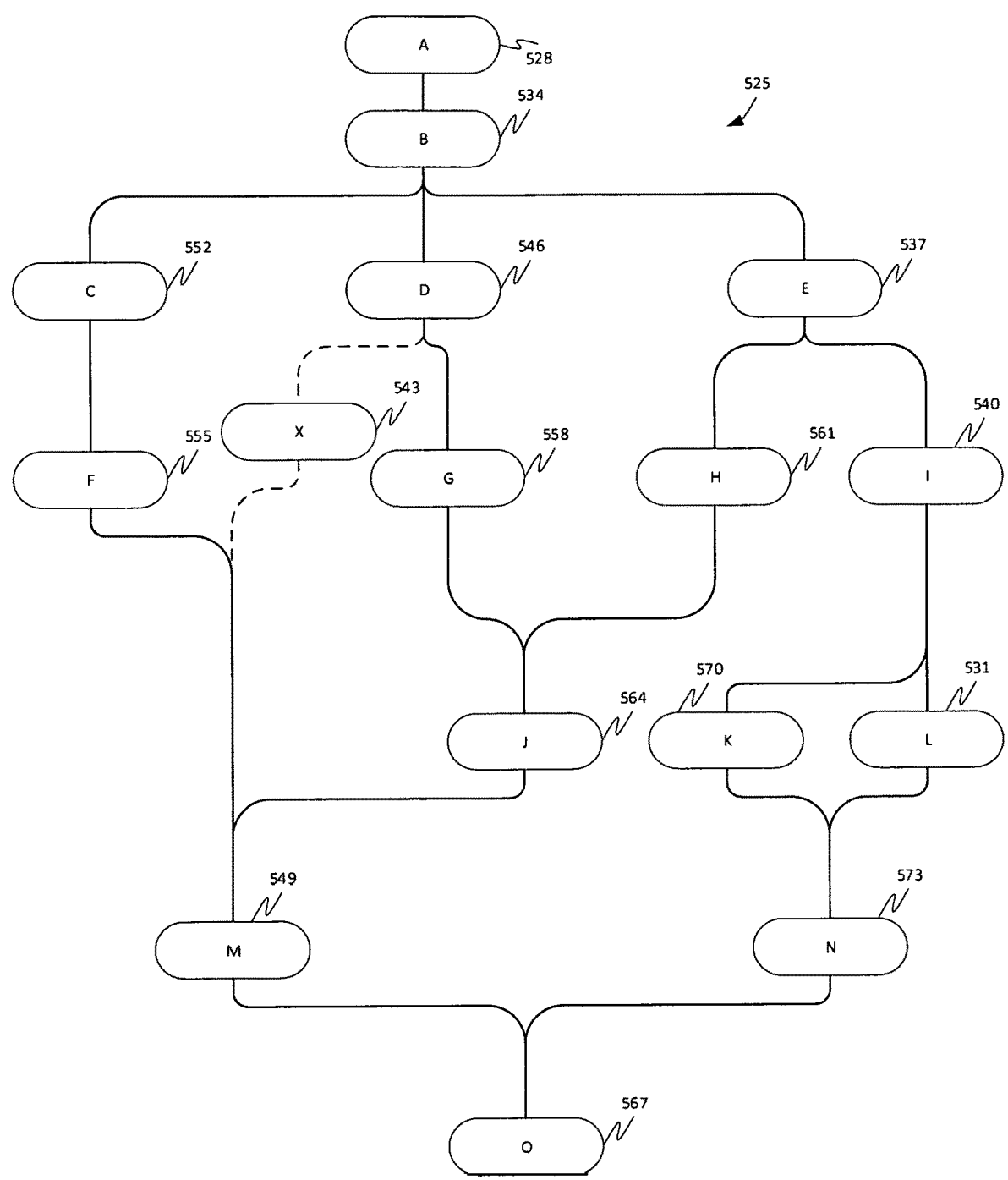
FIG. 5B illustrates a playbook in accordance with at least some embodiments of the present disclosure.

In some embodiments, a playbook 525 may comprise a flowchart of one or more tasks or other playbooks as illustrated in FIG. 5B. A playbook 525 may comprise a first task or playbook 528, labeled in FIG. 5B as 'A'. Note that any of the tasks of a playbook may comprise a number of other tasks. In general, a task will expect a particular piece or set of data in order to operate and will, in general, output one or more data points.

In some embodiments, a first task 528 may comprise a determination that all required inputs for the playbook to execute are accessible to the computer system executing the playbook. As an example, one playbook may be designed to send an email to all users of a particular type of client device alerting those users to a potential security threat. Such a playbook may require one or more pieces of data in order to begin, such as information associated with all users on a computer system, or IP addresses of all client devices, etc. Alternatively, such a playbook may require only an identity of a computer network and an identity of a cyber security threat. Other needed data may be collected via one or more tasks within the playbook before the emails are sent.

Tasks can be any action which can be automated or scripted. For example, querying a data source on a network or taking another action such as automatically drafting an email to be edited and/or sent by a security analyst. A task may comprise automatically searching a web browser search utility such as Google for a particular word, or may comprise wiping an affected system.

In some embodiments, client devices connected to the computer system may be executing one or more security computer program products. A security system as discussed herein may be designed such that security products on client devices can be queried to collect data gathered by the security products. For example, the security system discussed herein may be capable of utilizing APIs of a number of different security products on computer network objects existing across a network to gather data needed for one or more tasks.

A playbook may comprise a chain of tasks, wherein each task may accept as input one or more data points gathered in one or more of the previous tasks in the chain. To illustrate, in FIG. 5B, a task 'L' 531 may be capable of using data output from one of tasks 'A' 528, 'B' 534, 'E' 537, and 'I' 540. A playbook may be designed such that a task may never require input gathered from a task which is not a preceding task. For example, in FIG. 5B, task 'L' 531 may be designed such that no data gathered outside the chain of tasks 'A' 528, 'B' 534, 'E' 537, and 'I' 540 is needed to execute the task 531.

As such, execution of a task may stall until all preceding tasks have been completed. In the case of automated tasks, the system may make a determination that the proper output of a task has been received before moving to a following task. In the case of manual tasks, the system again may determine that the proper output of a task has been received before moving to a following task, or the system may rely on a security analyst to report to the system that a task has been completed.

In some embodiments, a security analyst may be enabled to quickly edit a playbook by simply adding tasks to an existing playbook. For example, as illustrated in FIG. 5B, a security analyst may take an existing playbook—as illustrated by those tasks in solid lines—and add a new task—illustrated by the dotted line task 543. Such a security analyst may place the new task 543 below task 'D' 546, indicating that the new task 543 should execute only after task 'D' 546 completes. The security analyst may draw a line as illustrated in FIG. 5B down from the new task 543 to the input of task 'M' 549. By adding the new task 543 as an input to task 'M' 549 of the existing playbook, the security analyst may ensure that task 'M' 549 will not execute until the data collected in task 543 is output by the system. Note that task 'M' 549 may also not execute until all of tasks 'A' 528, 'B' 534, 'C' 552, 'D' 546, 'E' 537, 'F' 555, 'G' 558, 'H' 561, 'J' 564, and the new task 543 have output the expected data points. Similarly, task 'O' 567 may not execute until all of tasks 'A' 528, 'B' 534, 'C' 552, 'D' 546, 'E' 537, 'F' 555, 'G' 558, 'H' 561, 'I' 540, 'J' 564, 'K' 570, 'L' 531, 'M' 549, 'N' 573 and the new task 543 have output the expected data points. In some embodiments, there may be fail safe systems such that in the event a particular data point cannot be gathered, for whatever reason, the system may carryon in the absence of such a data point.

Figure 5C:
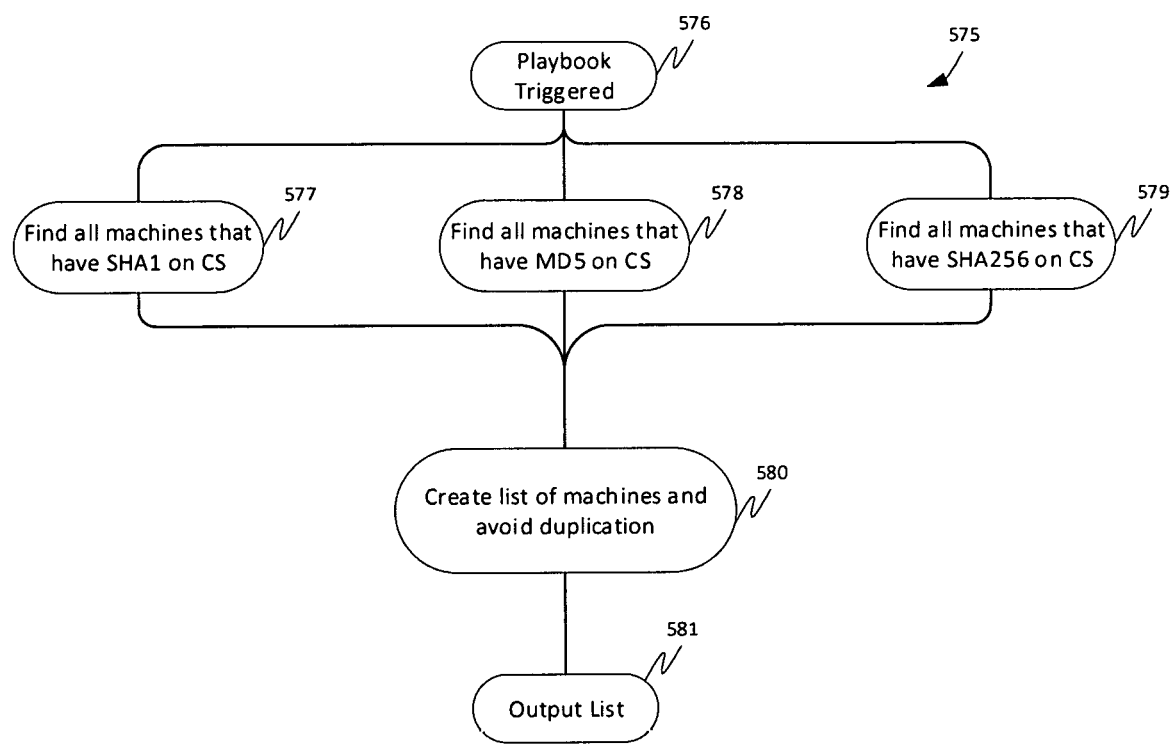
FIG. 5C illustrates a playbook in accordance with at least some embodiments of the present disclosure.

An example playbook 575 is illustrated in FIG. 5C. The playbook may be triggered 576 upon any number of events. For example, a task of another playbook may detect a particular potential security threat and, upon such a detection, the task may trigger the playbook of FIG. 5C. In some embodiments, a security analyst may determine the playbook of FIG. 5C is needed for the analysis of a particular cyber security threat. The playbook illustrated in FIG. 5C may be designed to generate and output a list of machines on a computer system having one or more of SHA1, MD5, and/or SHA256. The input to the system may comprise an identity of a computer system.

Upon the playbook being triggered 576, the example playbook 575 may execute three tasks in parallel as illustrated by tasks 577, 578, 579. In the example of FIG. 5C, the three parallel tasks may comprise a task 577 of finding all machines that have SHA1 on the input computer system, a task 578 of finding all machines that have MD5 on the input computer system, and a task 579 of finding all machines that have SHA256 on the input computer system.

The task 580 may not execute until either all three tasks 577, 578, 579 have executed to completion or fewer than all three if it is detected that one of the three previous tasks could not be executed. The tasks 577, 578, 579 may each be automated tasks, automatically finding the machines, or one or more of the tasks 577, 578, 579 may be a manual task. Each one of the three tasks 577, 578, 579 may output a list which may be used as an input to the task 580. Task 580 may also use as an input any input to the playbook 575 as well as any output of the first task 576. In the example of FIG. 5C, task 580 comprises taking the lists output from tasks 577, 578, 579 and creating a list of machines having one or more of SHA1, MD5, and/or SHA256 on the computer system and reducing the list such that there is no duplication. Following the completion of task 580, the playbook may comprise outputting the list 581.

Figure 5D:
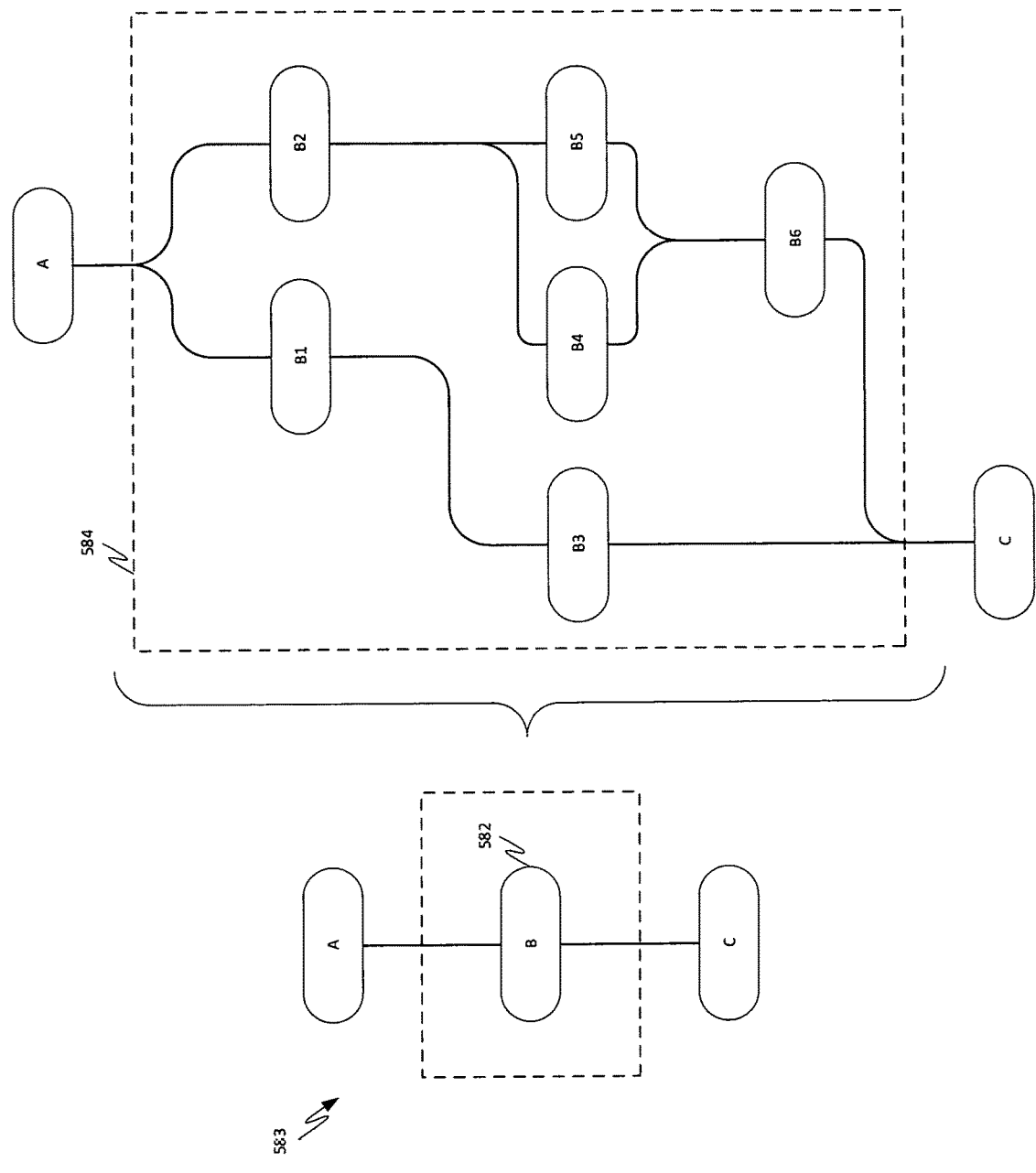
FIG. 5D illustrates a playbook in accordance with at least some embodiments of the present disclosure.

As illustrated in FIG. 5D, one element 582 of a playbook 583 may comprise another playbook 584. As a playbook may have one or more inputs and provide one or more outputs, a playbook may be very complex or simple. A task of a playbook may comprise one or more automated tasks as well as one or more manual tasks, or a task may comprise one or more solely automated or manual tasks. In the example of FIG. 5D, the task 582 may comprise the playbook 584. By representing an entire playbook as one task, new and complex playbooks may be created by a security analyst quite quickly without requiring each sub-task to be planned.

As some tasks, and some entire playbooks, may be automated, the processing of automated tasks may run in the background of the security platform system. A security analyst assigned to a particular security threat may not have a need to spectate the playbook operation and may only see those tasks which require manual input. Moreover, one security analyst may be assigned a number of potential security threats or incidents.

Such a security analyst may have a security analyst terminal, or PC, with a user interface 585 as illustrated in FIG. 5E. As can be appreciated, a security analyst terminal user interface 585 may display one or more pending tasks assigned to the security analyst as well as one or more tasks completed by the security analyst. A security analyst at the security analyst terminal may be capable of selecting a pending task and the user interface 585 may display information about the selected task. Information about the selected task may comprise information such as a deadline timestamp for the security analyst to complete the task, a severity of the task, an assigned analyst ID, a task ID, an incident ID, a playbook ID, as well as instructions for completing the task and buttons to input the information needed by the task. The user interface 585 may also allow for a security analyst to input notes associated with completing the task which may be saved in a report associated with the incident.

Figure 5F:
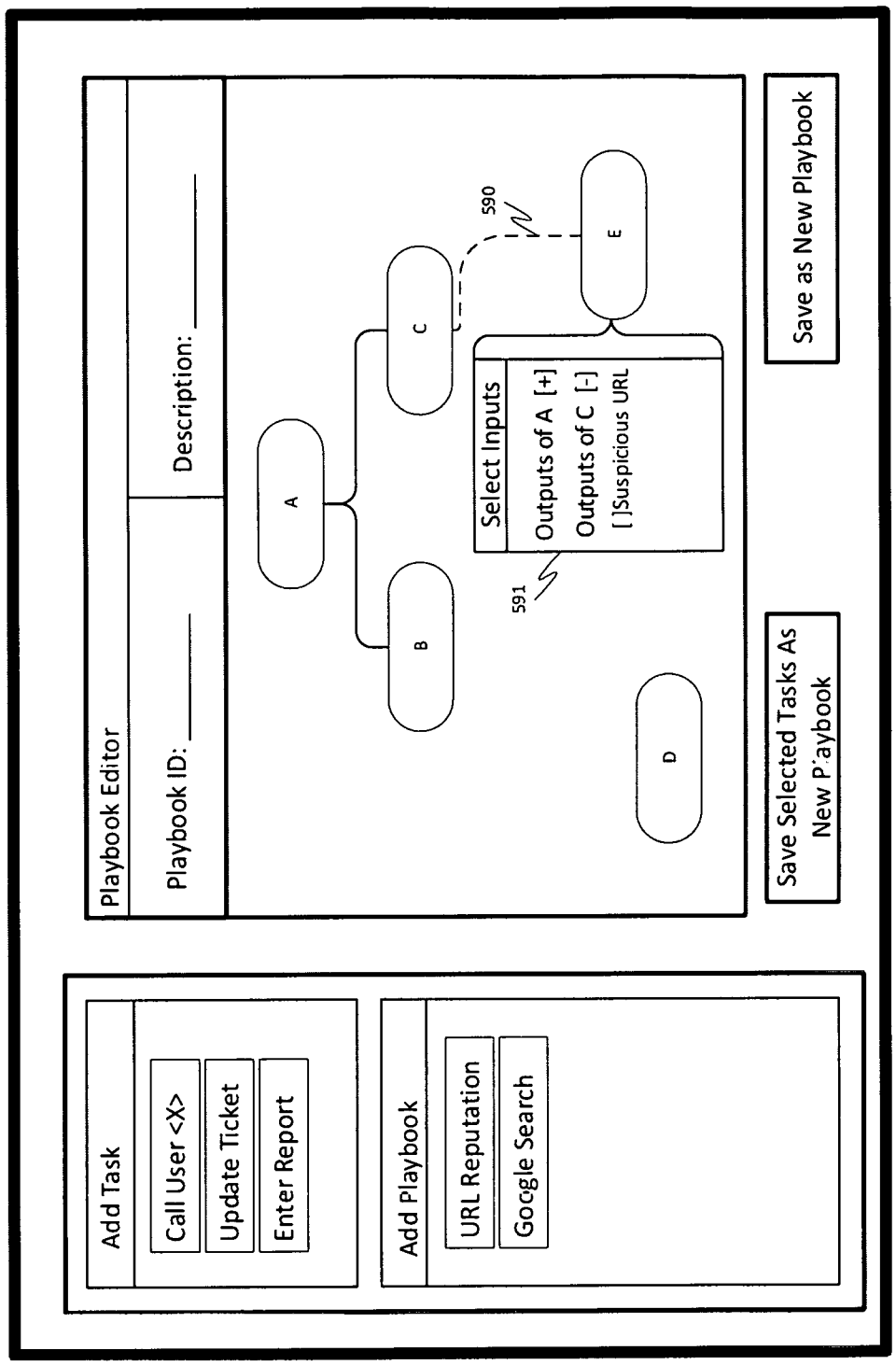
FIG. 5F illustrates a user interface in accordance with at least some embodiments of the present disclosure.

A security analyst may be capable, using a security platform, to create a task or playbook either from scratch or from other tasks or playbooks. For example, a security analyst may create a playbook from a number of existing tasks by dragging and dropping tasks into a playbook creator user interface as illustrated in FIG. 5F. Lines may be drawn by a security analyst into a task from another task indicating an order of operation. When a new line is drawn from the bottom of a task into the top of another task, the creating user may be shown a display of available inputs. For example, as illustrated in FIG. 5F, new task E has been added to the playbook. Line 590 may be drawn from task C into task E. A window 591 may pop up as the line 590 is drawn. As the line 590 is drawn out of C, all outputs of C as well as the outputs of A, being prior to tasks C and E, should be available as inputs to task E. The window 591 may allow a user to select from those outputs to decide on an input to the new task E.

The available inputs may comprise all outputs of all tasks or playbooks above the new lower task. In this way, it may be ensured that the playbook will never need a data point from a task that has yet to be executed. That is, by the time the new task has begun, all previous tasks will have executed and thus all requisite inputs for the task will have been gathered.

A security analyst may also be capable of selecting a number of tasks and saving them as a new playbook. Such a playbook, comprising any number of tasks, may be represented as a simple task, as illustrated in FIG. 5D. Such representation may enable security analysts to build increasingly complex playbooks without requiring every single task to be selected with each new playbook.

Figure 6:
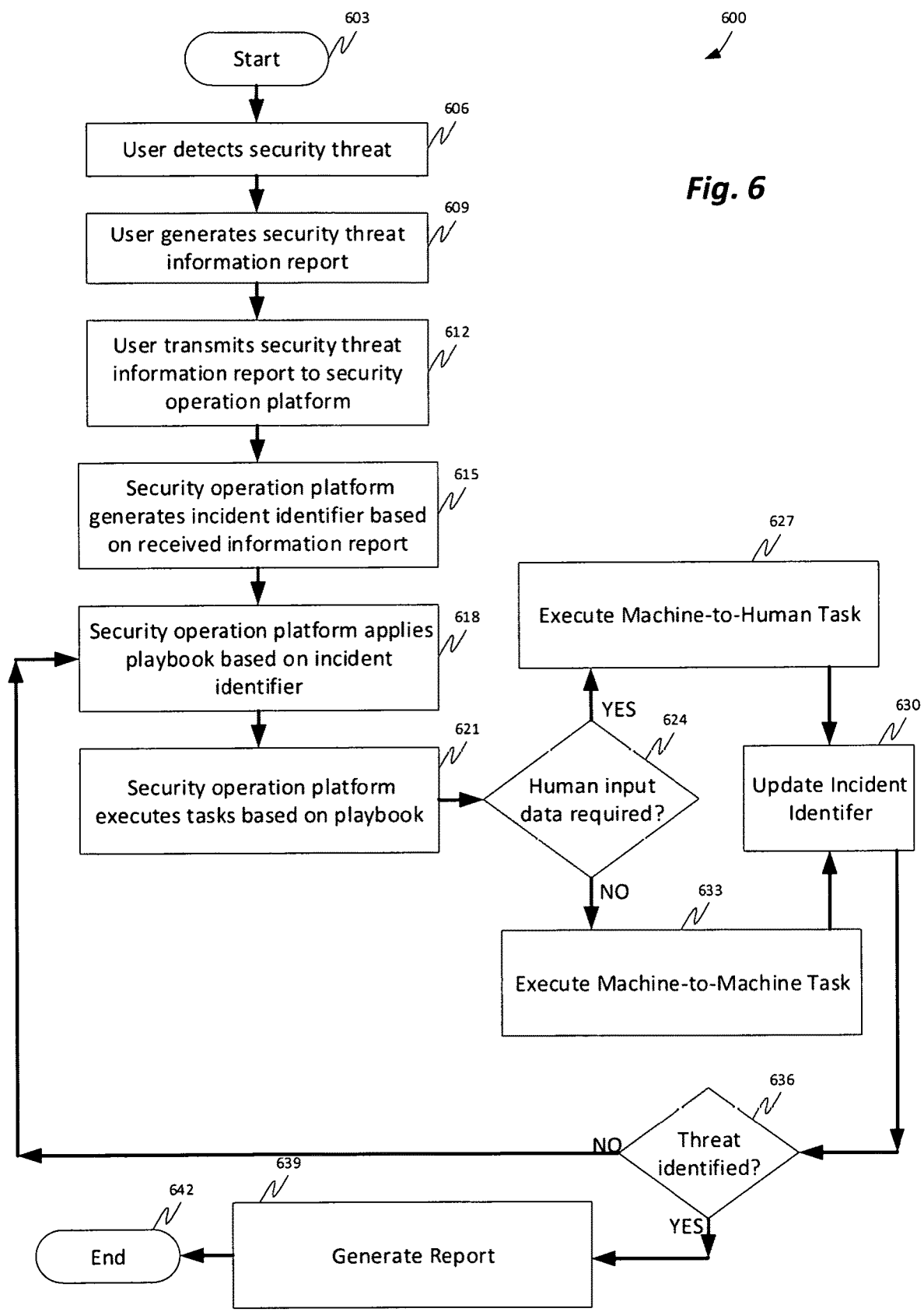
FIG. 6 is a flowchart of a method in accordance with at least some embodiments of the present disclosure.

An illustrative method 600 in accordance with some embodiments is illustrated in FIG. 6. At the start 603 of the method 600, a security analyst using a security analyst terminal may access a security operation platform. At step 606, a user may detect a security threat. In some embodiments, a user may be a remote user in communication with the security operation platform via an Internet connection. In some embodiments, a user may be a local user in communication with security operation platform via a local network connection. A user may detect a security threat on any type of computing device, for example a personal smart-phone, a laptop, a personal computer, a tablet device, etc.

A user may detect a security threat in many different ways. For example, the user may access a suspicious URL and may believe a security threat has occurred. The user may receive a suspicious email and/or download a suspicious file. The user may find a suspicious file on his or her device, or may otherwise suspect a potential security threat has occurred.

Upon detecting a potential security threat, the user at step 609 may generate a security threat information report. A security threat information report may be generated through a form or some other standardized request system. In some embodiments, a security threat information report may simply be generated by calling or chatting with a security analyst or an automated chat-bot on the security operation platform. In general, a security threat information report may comprise as much information as the user knows about the potential security threat. Such information may include a type of threat (suspicious email, suspicious URL, suspicious WIFI network, etc.), a severity level, an affected device information, etc.

A security threat information report may be sent to a security operation platform via a network or internet connection 612. For example, a security threat information report may be transmitted via a secure webpage or via a secure chat program as part of the security operation platform.

In some embodiments, a security operation platform may, instead of receiving security threat information from a user, detect a potential security threat using other means. For example, if a potential security threat is identified by the security operation platform, the security operation platform may begin the analysis program absent any instructions from a user.

Upon receiving, or detecting, information regarding a potential security threat, a security operation platform may generate an incident identifier as discussed above based on the received, or detected information, in step 615. In some embodiments, generating an incident identifier may comprise assigning a security analyst to manage the analysis process.

In step 618, the security operation platform may analyze the incident identifier and determine an initial playbook to be applied based on information in the incident identifier. For example, if the incident identifier indicates the potential security threat relates to a suspicious URL, the security operation platform may automatically load and apply a suspicious URL playbook to the incident identifier.

In step 621, the security operation platform may begin executing a first task from the determined playbook. In some embodiments, a task may either be a machine-to-machine task or a machine-to-human task. In the case of a machine-to-machine task, the security operation platform may generate and transmit a request for information from one or more network locations. In some embodiments, a machine-to-machine task may comprise polling a particular software application on a network device. For example, a machine-to-machine task may comprise obtaining data from an anti-virus program on an affected personal computer.

Machine-to-machine tasks may generally be automated and performed by a security operation platform with little to no input from a security analyst. Machine-to-human tasks, on the other hand, may in some cases rely on a response from a user and in some embodiments may require active steps performed by a security analyst. In step 624, the security operation platform may determine whether input is required from a human user.

If the security operation platform determines input is required from a human user, at step 627 the security operation platform may display a notification on a terminal of a security analyst instructing the analyst on steps to be taken to obtain the required data. For example, a notification may display contact information of an affected user and provide an instruction to a security analyst to call or email the affected user and provide specific instructions on one or more particular questions to ask to obtain the data.

In some embodiments, a security operation platform may be capable of drafting and sending such requests automatically. In some embodiments, a security operation platform may call an affected user and play recorded questions allowing for data to be retrieved automatically.

If the security operation platform determines input is not required from a human user, at step 633 the security operation platform may execute a machine-to-machine task. Executing a machine-to-machine task may comprise polling a network location for data associated with the security threat. In some embodiments, a machine-to-machine task may comprise sending a request for a data packet to a cyber security application on a network connected device.

After retrieving or otherwise obtaining the data required for the task, the security operation platform may update the incident identifier with the new data in step 630.

If the security threat can be identified at step 636, the security operation platform may generate a report at step 639 and the method may end at step 642.

In some embodiments, a report may comprise a description of the identified threat, and may comprise descriptions of one or more remedying actions to be executed in response to the identified threat. In some embodiments, upon identifying the security threat, the security operation platform may execute an appropriate remedy depending on the identity of the security threat.

If the threat cannot be identified at step 636, the method 600 may comprise returning to step 618, in which the security operation platform may review the data comprised in the incident identifier as updated in step 630 and determine a playbook to apply. In some cases, the security operation platform may simply apply the next step in the current playbook. In some embodiments the security operation platform may determine a particular data point is missing from the incident identifier and may apply a particular playbook in the aim of obtaining the missing data point. Based on such determination, a new task may be executed on the updated incident identifier and the method may return to step 621.

Figure 7:
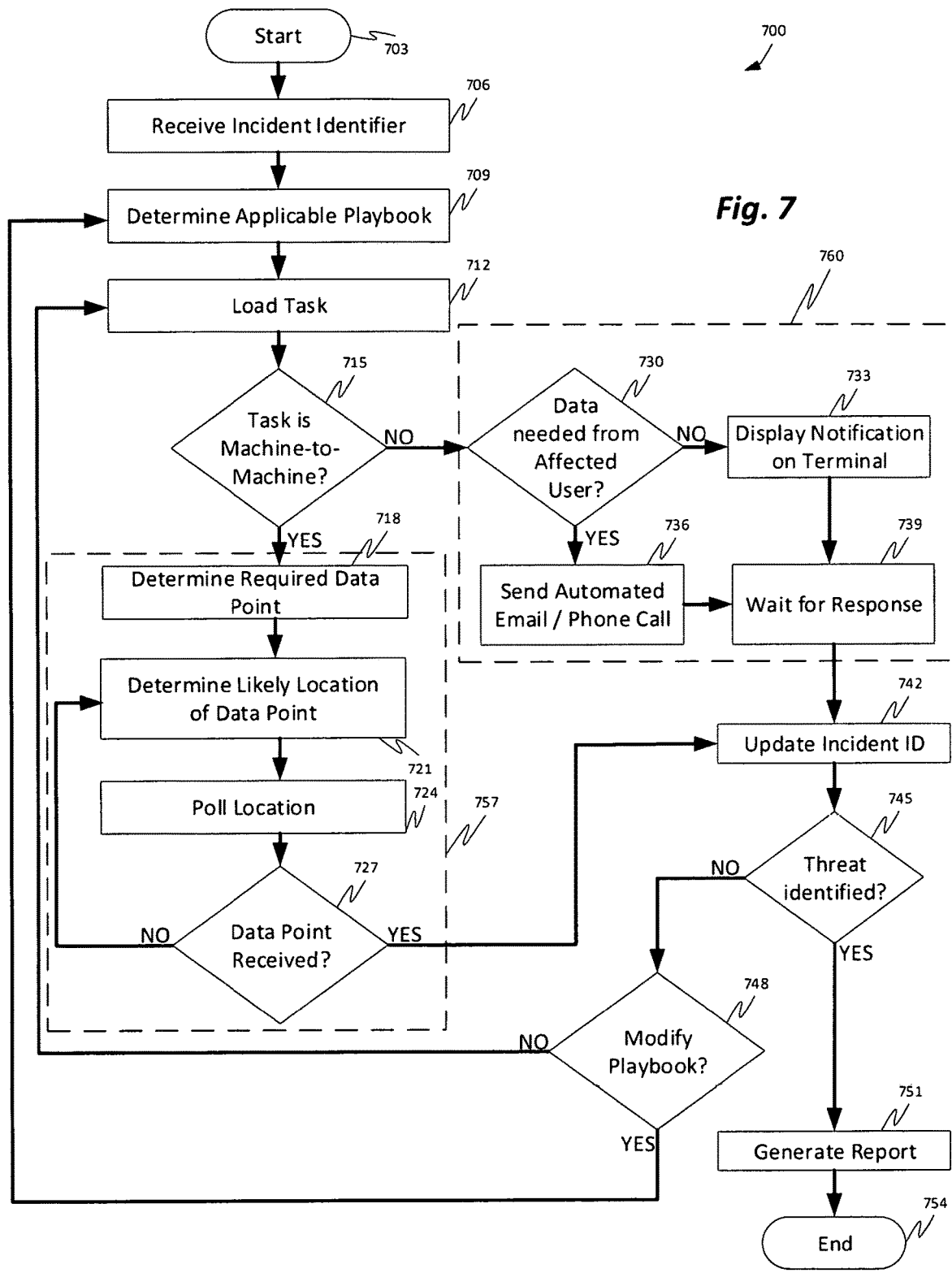
FIG. 7 is a flowchart of a method in accordance with at least some embodiments of the present disclosure.

In some embodiments, a security operation platform may analyze a potential security threat based on a method 700 as illustrated in FIG. 7. The method 700 may begin at step 703. At the beginning of the method 700, the security operation platform may have access to a database of playbooks as well as a database of incident identifiers. The security operation platform may be in communication with one or more security analyst devices. The security operation platform may also be capable of receiving incident identifiers and/or potential security threat information forms from one or more users via a network connection.

At step 706, the security operation platform may receive an incident identifier via the network. In some embodiments, the security operation platform may receive incident information via other means. For example, a security analyst may enter information regarding the incident manually. In other embodiments, the security operation platform may be capable of detecting a potential security threat automatically and proceeding to carry out the method 700 without human input.

At step 709, upon receiving the incident identifier, the security operation platform may determine an applicable playbook based on the incident identifier. In some embodiments, the security operation platform may make such a determination based on particular data that is missing from the incident identifier. For example, the timestamp of the occurrence of the potential security threat may be incomplete. A first playbook may be determined which allows the security operation platform to determine a time and/or date of the occurrence of the potential security threat.

In some embodiments, the applicable playbook may be determined based on a type of potential security threat. For example, if the type of potential security threat is a suspicious email, a suspicious email playbook may be chosen. Tasks comprised by the suspicious email playbook may include tasks designed to investigate the source of the suspicious email and/or determine whether other users have received the same or similar emails.

At step 712, the security operation platform may load a first task of the applicable playbook. At step 715, the security operation platform may determine whether the first task of the applicable playbook is a machine-to-machine task. A machine-to-machine task may be an action performable by the security operation platform and may comprise any number of computer functions which involve in some way obtaining information from a network source associated with the potential security threat.

If it is determined, by the security operation platform, that the first task of the applicable playbook is a machine-to-machine task, the method 700 may proceed to the steps illustrated in box 757. In step 718, the security operation platform may determine which data point is required by the first task. In some embodiments, a task may explicitly inform the security operation platform of the data point needed. In some embodiments, a task may include a number of data points to be obtained by the security operation platform.

At step 721, the security operation platform may determine a likely location of the data point. In some embodiments, a task may explicitly include a location where the data point may be obtained. In some embodiments, the security operation platform may determine in other ways the location, or a likely location, of the data point. In some embodiments, the location may be a network address, or a data resource of an application executing on a client device accessible via a network connection.

At step 724, the security operation platform may poll the determined location of the data point. In some embodiments, the security operation platform may send a request to an application executing on a client device. Such a request may be met with a response from the application containing the required data point. In some embodiments, data points may be automatically obtained by the security operation platform in other ways.

At step 727, the security operation platform may determine whether the required data point was received. If the required data point was not received, the security operation platform may determine another likely location of the data point in step 721. This loop may continue until, at step 727, the security operation platform determines the data point is received. Upon receiving the needed data point, the method 700 may proceed to step 742, discussed below.

If, at step 715, the security operation platform determines that the task is not a machine-to-machine task, the method 700 may comprise proceeding to the steps in box 760. At step 730, the security operation platform may determine whether the data needed is needed from the affected user, or if the data needed can be acquired by a security analyst.

If the data needed can be acquired by a security analyst, the method 700 may proceed to step 733. At step 733, the security operation platform may display a notification on a terminal of a security analyst. Such a notification may comprise a set of instructions to be carried out by a security analyst. For example, the notification may instruct the security analyst to contact the affected user or another person to ask a series of questions. The notification may instruct the security analyst to contact other sources.

If the data needed is needed from the affected user, the method 700 may proceed to step 736. At step 736, the security operation platform may draft and send an automated email and/or initiate an automated telephone call to the affected user. Such a step may be executed in the event that one or more data points needed for the security threat evaluation may be acquired through contacting the affected user. The security operation platform may be capable of accessing a database comprising a number of emails, automated phone call recordings, and other means of accepting input from an affected user via the network connection or another communication system.

Following steps 733 and 736, the method 700 may proceed to step 739. At step 739, the security operation platform may wait for input from the human user. After receiving such input, the method 700 may proceed to step 742, discussed below.

As may be appreciated, during a machine-to-human task, as illustrated by the steps within box 760, the security operation platform may continue with a secondary task that may be executed while the security operation platform waits for input from the human user.

At step 742, the security operation platform may update the incident identifier with the received data point. In some embodiments, a new field may be added to the incident identifier, a current field may be modified or expanded, or a field may be removed based on the received data point. As more data points are obtained by the security operation platform, the incident identifier may be more useful in identifying the potential security threat.

At step 745, the security operation platform may determine if, based on the updated incident identifier, the security threat may be identified. If the security threat may not be identified, the method 700 may proceed to step 748. At step 748, the security operation platform may determine whether, based on the updated incident identifier, the playbook should be modified. For example, new data points obtained by the security operation platform may lead the search for the security threat in a new direction. A new playbook may be applicable based on the new information. If the playbook should be modified, the method 700 may comprise returning to step 709—at which point the security operation platform may determine a new applicable playbook to load and execute. If, on the other hand, the playbook should not be modified, the method 700 may comprise returning to step 712 in which the next task of the playbook is loaded.

When the security threat is identified, the method 700 may proceed to step 751. At step 751, the security operation platform may generate a report based on the identified threat. Such a report may comprise the information included in the updated incident identifier. The report may in some embodiments comprise next steps to be taken by a security analyst, the affect user, or other entities. The report may be presented via a UI to a security analyst, or the affected user, or may be saved as a file on a network location. After generating a report, at step 754, the security operation platform may end.

The illustrative systems and methods of this invention have been described in relation to a security operation platform. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the illustrative embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, the data stream reference module is applied with other types of data structures, such as object oriented and relational databases.

In another alternative embodiment, the data stream reference module is applied in architectures other than contact centers, such as workflow distribution systems.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Illustrative hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention.

Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, sub combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
    a processor; and
    a memory coupled to the processor and comprising computer-readable program code that when executed by the processor causes the system to perform operations comprising,
    analyzing an incident identifier to determine a playbook or sequence of playbooks as applicable, wherein the incident identifier includes a first set of information collected about a suspected cyber security threat;
    based on a determination that a first playbook is applicable, running the first playbook to identify the suspected cyber security threat, wherein running the first playbook comprises,
        loading and executing a chain of tasks in order as defined in the first playbook to collect one or more additional data points corresponding to the suspected cyber security threat,
        updating the incident identifier with the collected additional data points,
        prior to completion of running the first playbook, determining based on the updated incident identifier at least one of whether a different playbook is applicable and whether the suspected cyber security threat can be identified;
    based on a determination that a different playbook is applicable, identifying and running a second playbook based on the updated incident identifier; and
    based on a determination that the suspected cyber security threat can be identified, generating a report that identifies the suspected cyber security threat.

2. The system of claim 1, wherein the first set of information comprises one or more of an occurrence timestamp, a severity level indicator, an incident type, user information, and IP address information.

3. The system of claim 1, further comprising determining that a sequence of playbooks is applicable based on analyzing the incident identifier, wherein the sequence of playbooks includes the first playbook.

4. The system of claim 1, wherein executing the chain of tasks comprises executing an intermediate task in the chain of tasks with output of a preceding task as input to the intermediate.

5. The system of claim 1, wherein at least one of the tasks in the chain of tasks defined by the first playbook comprises a machine-to-human interaction to gather one of the one or more additional data points.

6. The system of claim 1, wherein the report also indicates a response action.

7. The system of claim 1, wherein execution of an initial task in the chain of tasks defined by the first playbook causes the system to determine accessibility of inputs to run the first playbook.

8. The system of claim 1, wherein the memory comprises computer-readable program code that when executed by the processor causes the system to present for display a graphical representation of the chain of tasks defined by the first playbook.

9. The system of claim 8, wherein program code that when executed by the processor causes the system to present for display a graphical representation of the chain of tasks defined by the first playbook comprises program code that when executed by the processor causes the system to display inputs and outputs of a currently loaded and executing task.

10. The system of claim 1, wherein updating the generated incident identifier with the collected additional data points comprises updating the incident identifier after each collection of one or more of the additional data points corresponding to a task execution and wherein determining based on the updated incident identifier at least one of whether a different playbook is applicable and whether the suspected cyber security threat can be identified is after each updating of the incident identifier.

11. The system of claim 1, wherein analyzing the incident identifier to determine a playbook or sequence of playbooks as applicable comprises determining at least one of an incident type and absence of information from the incident identifier.

12. A method comprising:
    analyzing an incident identifier to determine a playbook or sequence of playbooks as applicable for identifying a cyber security event, wherein the incident identifier includes a first set of information about the cyber security event;
    based on a determination that a first playbook is applicable, running the first playbook to collect additional data points about the cyber security event, wherein running the first playbook comprises,
        loading and executing tasks specified in the first playbook based on input dependencies among the tasks as defined in the first playbook,
        iteratively updating the incident identifier with those of the additional data points collected at completion of each of at least a subset of the tasks in the first playbook,
        while running the first playbook, determining based on the updated incident identifier at least one of whether a different playbook is applicable and whether the cyber security event can be identified;
    based on a determination that a different playbook is applicable, retrieving and running a second playbook based on the updated incident identifier; and
    based on a determination that the cyber security event can be identified with the updated incident identifier, generating a report that identifies the cyber security event.

13. The method of claim 12 further comprising generating the incident identifier from one or more of a threat reporting form submitted via a user interface and an event description from a security analyst device.

14. The method of claim 12, wherein determining based on the updated incident identifier at least one of whether a different playbook is applicable and whether the cyber security event can be identified while running the first playbook, is after each update of the incident identifier.

15. The method of claim 14, wherein determining whether a different playbook is applicable is based on a determination that the cyber security event cannot yet be identified based on the updated incident identifier.

16. The method of claim 12, wherein loading and executing tasks specified in the first playbook based on input dependencies among the tasks as defined in the first playbook comprises loading and executing tasks in parallel that are not dependent on each other for input and have their inputs available.

17. The method of claim 12, wherein loading and executing tasks specified in the first playbook based on input dependencies among the tasks as defined in the first playbook comprises concurrently loading and executing a first task comprising a machine-to-human interaction and a second task comprising a machine-to-machine interaction based on a determination that the first and second tasks are input independent of each other.

18. The method of claim 12 further comprising determining accessibility of inputs to run the first playbook based on loading and executing an initial task specified by the first playbook.

19. The method of claim 12, further comprising presenting for display a graphical representation of the tasks specified by the first playbook and according to the input dependencies defined by the first playbook.

20. The method of claim 19 further comprising:
    pre-calculating tasks and flows for the first playbook;
    calculating paths of the first playbook in response to each edit of the first playbook;
    pre-filtering edit options based on the path calculations; and
    presenting for display edit options in a first user interface according to the pre-filtering of edit options and calculated paths.

21. The method of claim 12, wherein analyzing the incident identifier to determine a playbook or sequence of playbooks as applicable comprises determining at least one of an incident type and absence of information from the incident identifier.

22. A non-transitory machine-readable medium comprising program code to:
    analyze an incident identifier to determine a playbook or sequence of playbooks, wherein the incident identifier includes a first set of information about a cyber security event;
    based on the analysis, run a first playbook to collect additional data points about the cyber security event, wherein the program code to run the first playbook comprises program code to,
        load and execute tasks according to input dependencies among the tasks as defined in the first playbook,
        update the incident identifier with those of the additional data points collected at completion of each of at least a subset of the tasks in the first playbook,
        while running the first playbook, determine based on the updated incident identifier at least one of whether a different playbook is applicable and whether the cyber security event can be identified;
    based on a determination that a different playbook is applicable, retrieve and run a second playbook based on the updated incident identifier; and
    based on a determination that the cyber security event can be identified with the updated incident identifier, generate a report that identifies the cyber security event.

23. The non-transitory machine-readable medium of claim 22, wherein the program code to analyze the incident identifier to determine a playbook or sequence of playbooks comprises program code to determine at least one of an incident type and absence of information from the incident identifier.

24. The non-transitory machine-readable medium of claim 22, wherein the program code to determine based on the updated incident identifier whether a different playbook is applicable comprises program code to analyze the updated incident identifier.

* * * * *